United States Patent
Chang

(10) Patent No.: US 11,044,418 B2
(45) Date of Patent: Jun. 22, 2021

(54) THREE CAMERA ALIGNMENT IN MOBILE DEVICES

(71) Applicant: Black Sesame International Holding Limited, Santa Clara, CA (US)

(72) Inventor: Kuochin Chang, Cupertino, CA (US)

(73) Assignee: Black Sesame International Holding Limited, San Jose, CA (US)

( * ) Notice: Subject to any disclaimer, the term of this patent is extended or adjusted under 35 U.S.C. 154(b) by 73 days.

(21) Appl. No.: 16/044,228

(22) Filed: Jul. 24, 2018

(65) Prior Publication Data

US 2020/0036905 A1    Jan. 30, 2020

(51) Int. Cl.
*H04N 5/247* (2006.01)
*G03B 13/36* (2021.01)
*H04N 17/00* (2006.01)
*G06T 7/80* (2017.01)

(52) U.S. Cl.
CPC ............. *H04N 5/247* (2013.01); *G03B 13/36* (2013.01); *G06T 7/85* (2017.01); *H04N 17/002* (2013.01)

(58) Field of Classification Search
CPC ........ H04N 5/247; H04N 17/002; G06T 7/85; G03B 13/36
USPC ......................................................... 348/48
See application file for complete search history.

(56) References Cited

U.S. PATENT DOCUMENTS

| 9,866,820 B1* | 1/2018 | Agrawal ............ G06K 9/00281 |
| 2016/0323516 A1* | 11/2016 | Medasani .......... H04N 5/23296 |
| 2017/0180706 A1* | 6/2017 | Salvagnini ................ G06T 7/85 |
| 2018/0210465 A1* | 7/2018 | Qu ............................ G06T 7/74 |

* cited by examiner

*Primary Examiner* — Ayman A Abaza
(74) *Attorney, Agent, or Firm* — Timothy T. Wang; Ni, Wang & Massand, PLLC

(57) ABSTRACT

A three camera alignment system, having a first camera module having a first fixed zoom, a second camera module having a second fixed zoom coupled to the first camera module, wherein the second camera module is calibrated to the first camera module and a third camera module having a third fixed zoom coupled to at least one of the first camera module and the second camera module and wherein the third camera module is aligned to the calibrated first camera module and second camera module based on block matching along epipolar lines.

10 Claims, 7 Drawing Sheets

THREE CAMERA ALIGNMENT IN MOBILE DEVICES

BACKGROUND

Technical Field

The instant disclosure, is related to digital photography and more specifically to the alignment of three camera modules in a mobile device and the implementation of optical zoom without the use of optical zoom lens.

Background

Dual camera implementations in mobile devices utilize Z direction information in order to calibrate the cameras and pre-define a relationship between disparity and Z distance. The introduction of a third camera into a dual camera implementation may utilize a calibration method that differs from a dual camera calibration.

SUMMARY

In one embodiment, a three camera alignment system, includes a first camera module having a first fixed zoom, a second camera module having a second fixed zoom coupled to the first camera module, wherein the second camera module is calibrated to the first camera module and a third camera module having a third fixed zoom and coupled to at least one of the first camera module and the second camera module and wherein the third camera module is aligned to the calibrated first camera module and second camera module based on block matching along epipolar lines.

In another embodiment, a three camera alignment method, includes calibrating a first camera module having a first fixed zoom and a second camera module having a second fixed zoom, block matching a third camera module having a third fixed zoom to the calibrated first camera module and second camera module, wherein the block matching is based on epipolar lines and aligning the third camera module to the calibrated first camera module and second camera module.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In, the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
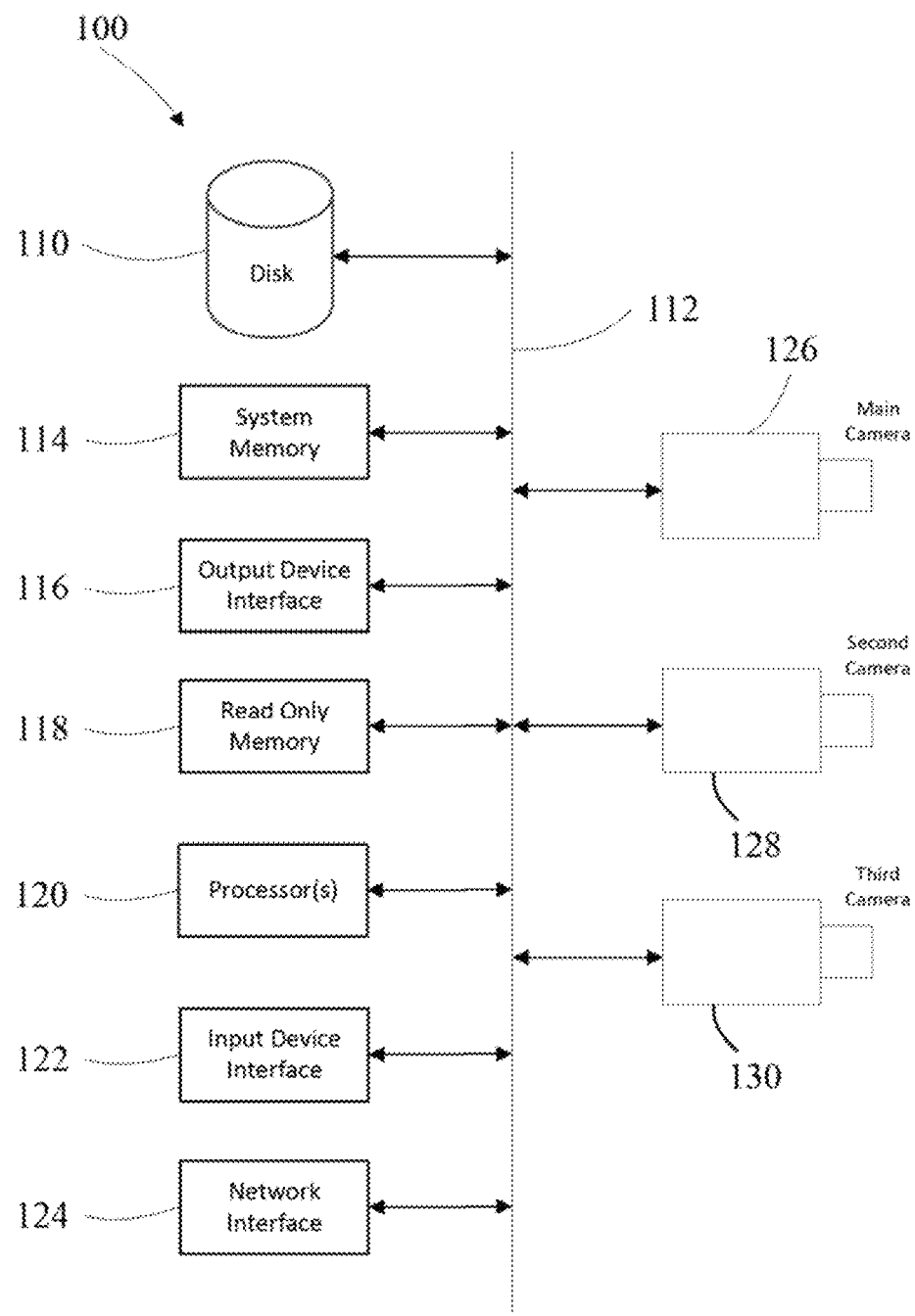
FIG. 1 is a system diagram in accordance with one embodiment of the disclosure.

FIG. 1 depicts an example electronic system for use in connection with a system having three cameras. Electronic system 100 may be a computing device for execution of software associated with the operation of one or more portions or steps of process 700, or components and processes provided by FIG. 7. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to a first camera module sensor 126 having a first zoom, a second camera module 128 having a second zoom and a third camera module 130 having a third zoom. In one embodiment the first zoom is 1×, the second zoom is 2× and the third zoom is 3×.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, first camera module module 126, second camera module 128 and third camera module 130.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or Wi-Fi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any firm, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client server relationship to each other. Data generated at the client device (e.g., a result of the user interaction) can be received from the client device at the server.

Figure 2:
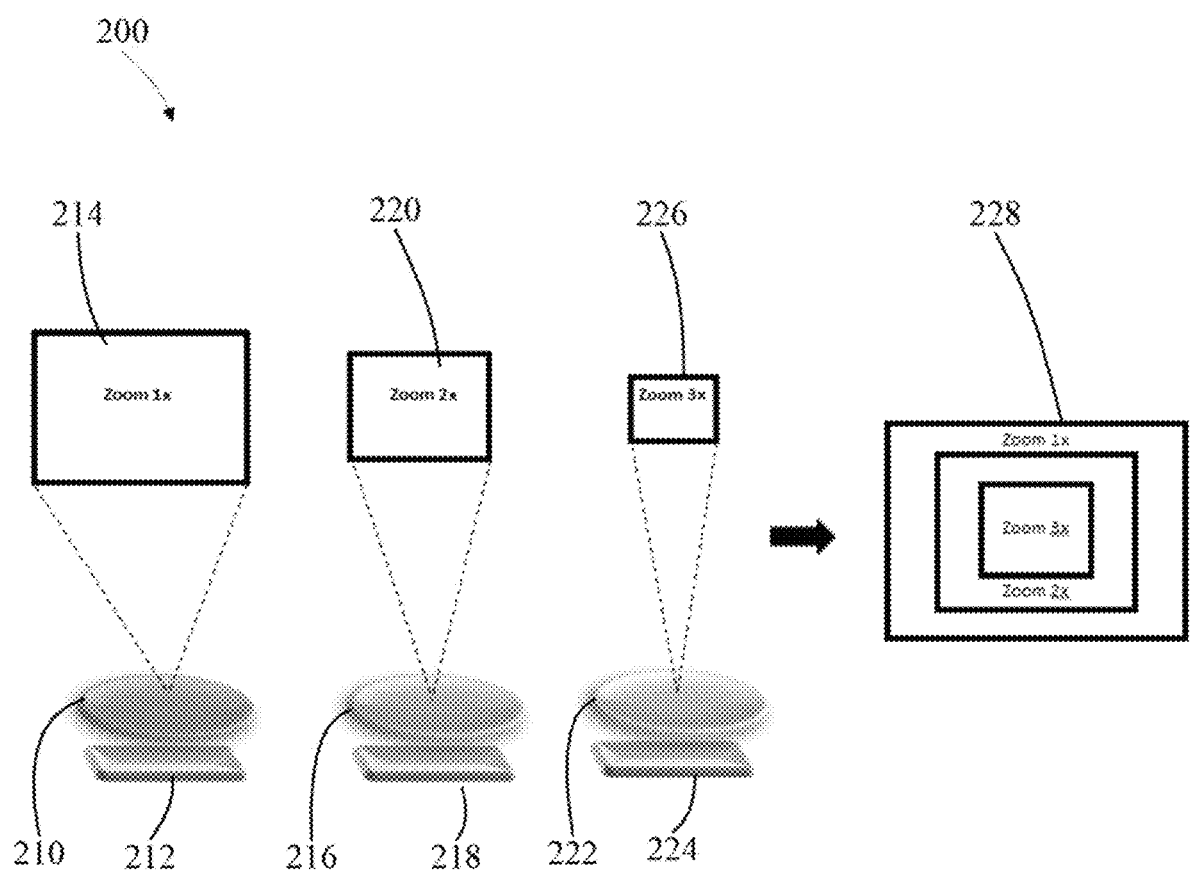
FIG. 2 is a system diagram showing a three camera layout in accordance with one embodiment of the disclosure.

FIG. 2 depicts an example three-camera module setup 200 that provides optical zoom without using optical zoom lens. The form factor of traditional zoom lens is not suitable for mobile devices. Optical zoom features on mobile devices may be achieved by using multiple cameras with different lens field of view (FOV) and focal length. The first camera module has an optical sensor 212 and a 1× zoom lens 210 yielding a field of view 214. The second camera module has an optical sensor 218 a 2× zoom lens 216 and yields a field of view depicted by 220. The third camera module comprises a sensor 224 a 3× zoom lens 222 and yields a field of view depicted by 226. As is shown in this example the field of views are situated within one another as shown by field of view overlap 228. As a user adjusts zoom, a software algorithm may fuse the images from cameras 126, 128 and 130 to deliver a zoomed image.

In the instant disclosure a dual camera system may zoom from 1× to 2×, the addition a third camera having a 3× zoom does not necessitate an additional calibration to align this third camera module to the existing dual camera system. As long as the third camera module 3× FOV is inside second camera module 2× zoom FOV a software algorithm may perform rotation and shift to achieve the 3× zoom function.

An example first camera (M) to second camera (S) calibration may comprise:

1) aligning a calibration chart and the first camera module and the second camera modules so that the chart and the cameras are parallel to one another;

2) adjusting lighting source;

3) adjusting a distance between the camera lens of the first camera module and the second camera module to the calibration chart;

4) capturing an image from the first camera module and the second camera module; and 5) determining the module alignment parameters between the first camera module and the second camera module.

Figure 3:
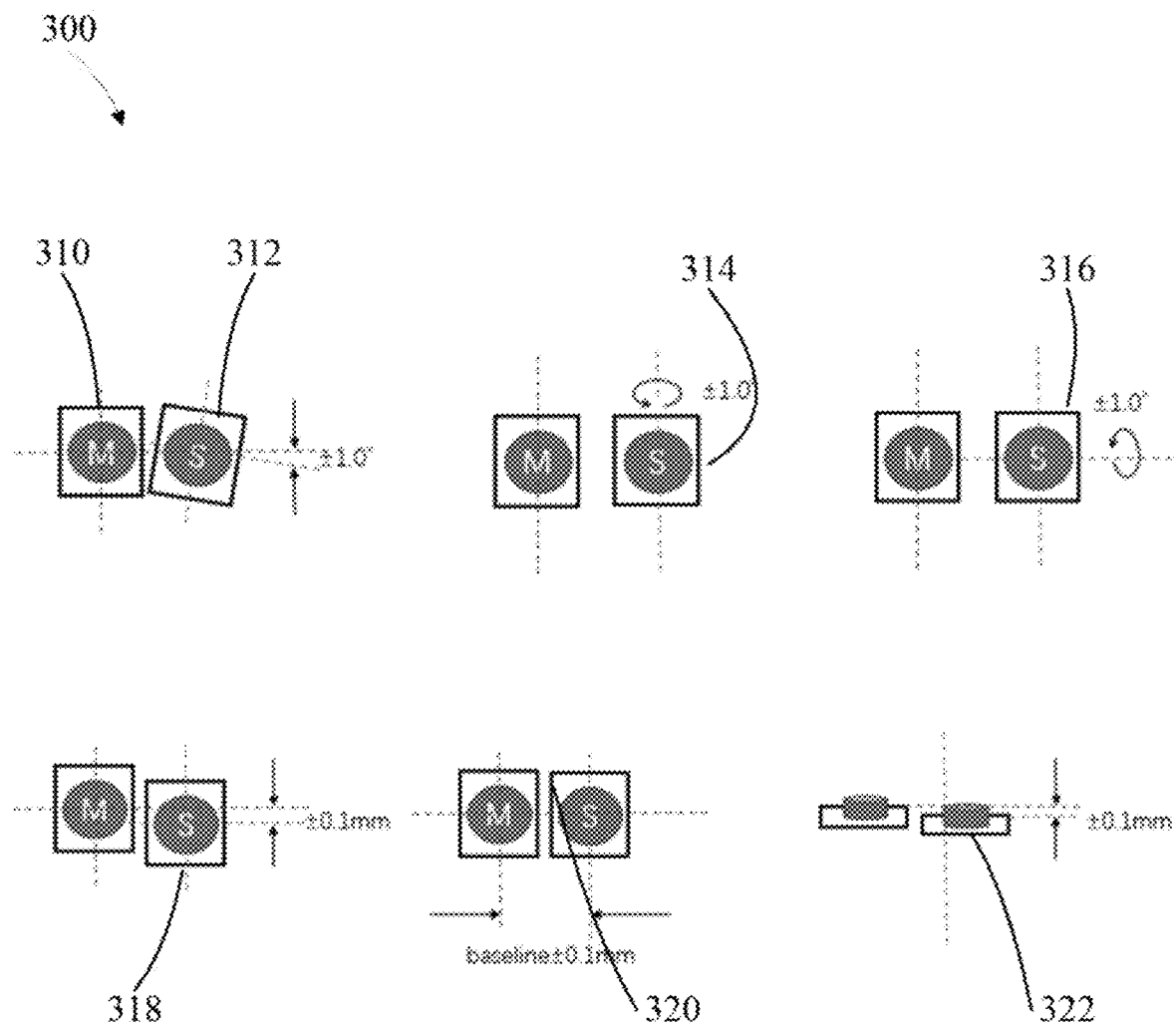
FIG. 3 depicts the rotations and shifts between a main camera module and a second camera module.

FIG. 3 depicts a first camera module to second camera module alignment having a main camera 310, denoted by M and a second camera denoted by S. The S camera may be rotated about the z axis 312, about the y axis 314 and about the x axis 316. The second camera module may also be offset from the first (main) camera module in the v direction 318, the x direction 320 and the z direction 322. Each of those misalignments are calibrated out during the first camera module to second camera module calibration.

In a manner like human binocular vision, a stereo vision system has two cameras mounted side by side horizontally having a known distance between their optical centers. Two slightly different views of a same scene may be captured by these two cameras.

Figure 4:
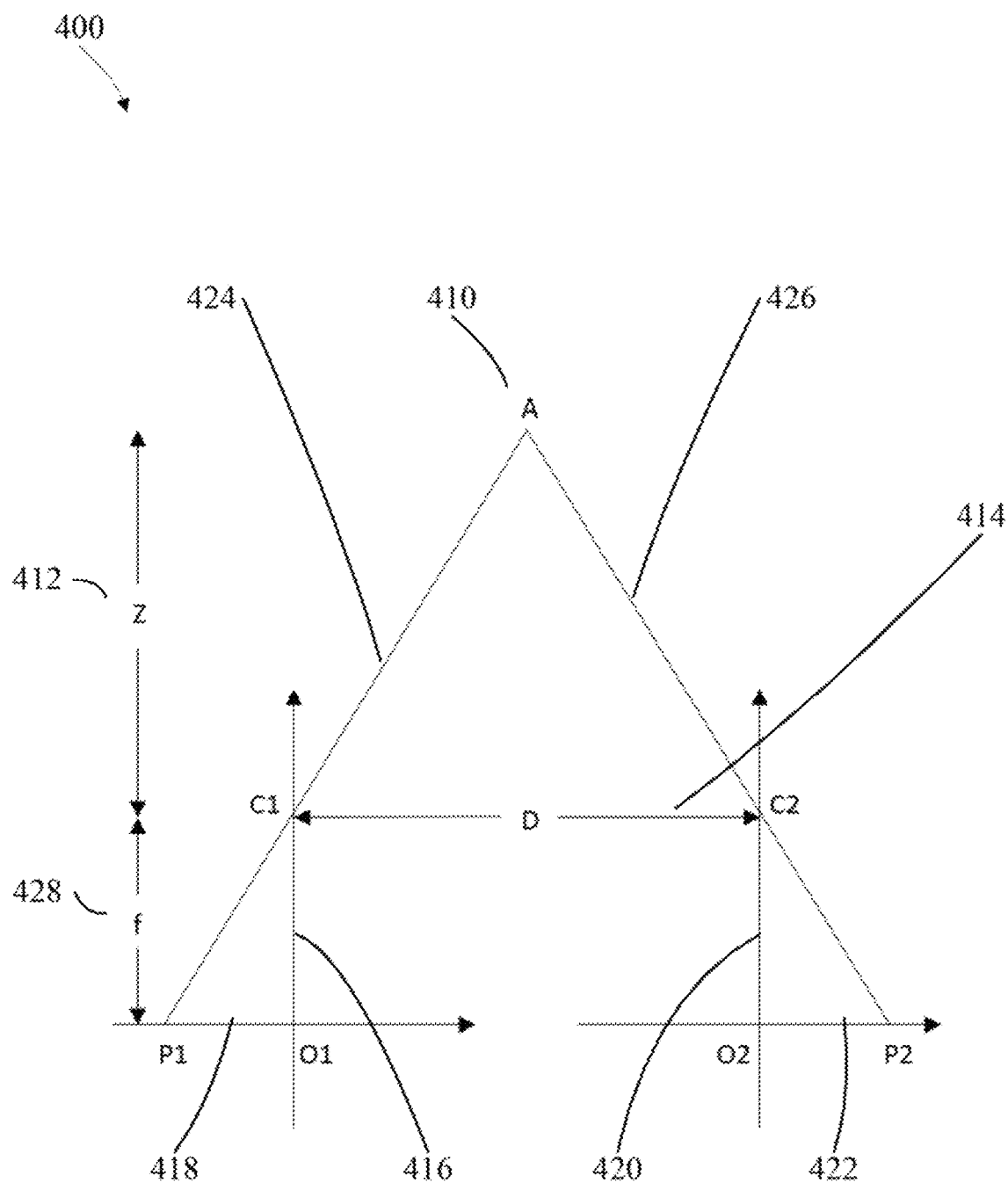
FIG. 4 is a system diagram showing a stereo vision layout in accordance with one embodiment of the disclosure.

As shown in FIG. 4, light rays 424 and 426 from object point A 410 is transmitted through an entry point of two pin-hole cameras and having two projections (P1 and P2) on an image plane. Based upon triangular similarity, the equation depicting the ratio between disparity d=(P1O1(416, 418)+O2P2 (420, 422)) and focal length (f) 428 is equal to the ratio between optical center distance (D) (214)=C1C2 and depth (Z) (412) of point A:d/f=D/Z In stereo systems, the two cameras may not be identical co-planar pin-hole cameras. Instead, a rectification algorithm is applied to the images to simulate an output as if the images were captured by two identical co-planar pin-hole cameras. This step includes both linear and non-linear transformations. The parameters of these transformations are often calibrated in an offline calibration step, in which a controlled scene is captured by the system. To recover depth from the disparity, the focal length (f) and camera distance (D) are needed, which may also be calibrated in the offline calibration step. To compute the disparity, identification that the pixel pair are from the same object point is found by comparing their image similarities.

Figure 5:
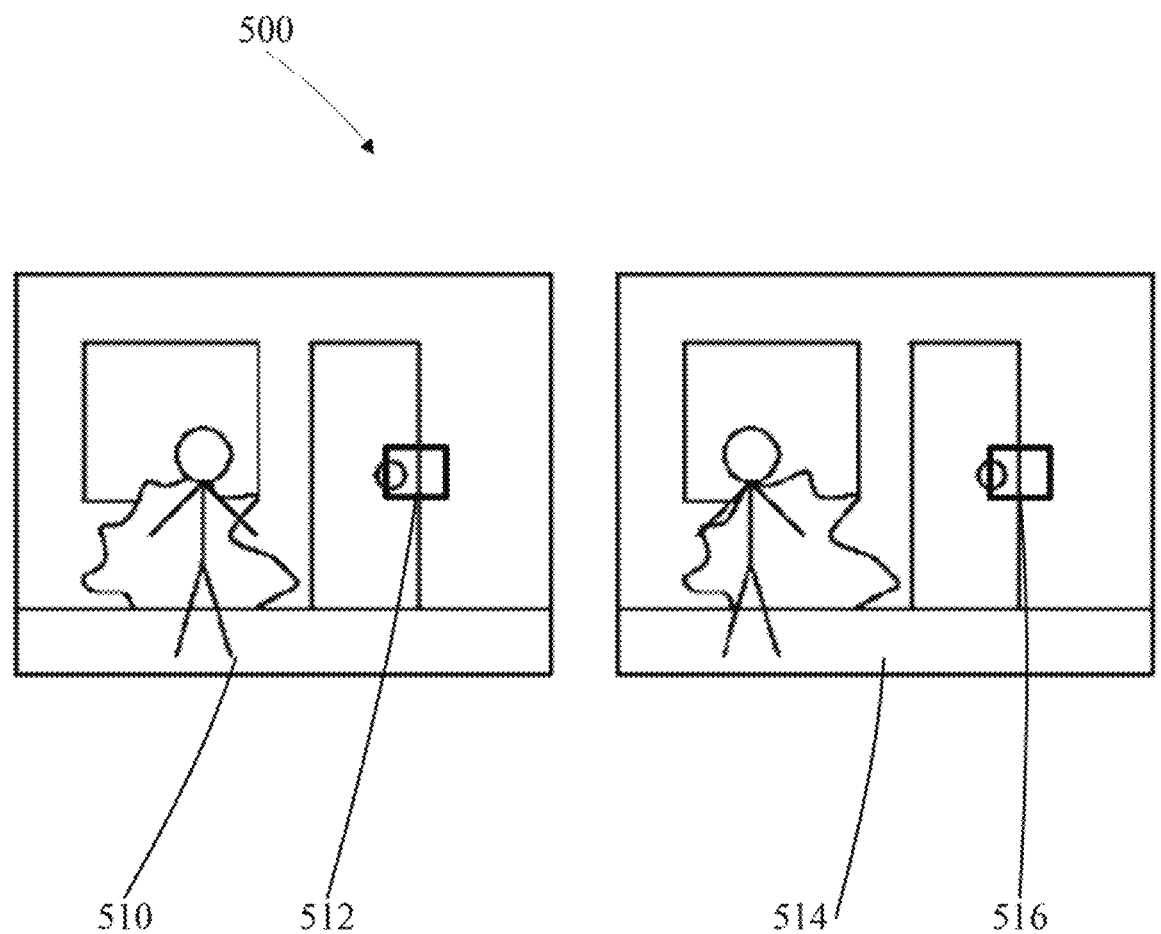
FIG. 5 is a depiction of focus windows in a calibrated system and in a third camera module in accordance with one embodiment of the disclosure.

Once the first camera module and the second camera module have been calibrated, the third camera will need to be aligned to the calibrated first and second camera modules. In the example shown in FIG. 5, given the image data of $I_M$ within the given focus window $W_M$, a third window ($W_T$) in the third image $I_T$ is found which contains the same physical area as $W_M$ in $I_M$. Generally, this searching process is conducted along corresponding epipolar lines of the center of $W_M$. Because of distortion and geometric correction, the epipolar line will be the horizontal scanline. $I_T$ which may be found using different methods, such as sum of absolute differences (SAD), maximum correlation coefficients (MCC) and the like.

For the position (coordinates) of $W_M$ in the main image and those of $W_S$ in the second image, they are mapped to a rectified coordinates system, denoted as $X_M$ in the main rectified image and $X_T$ in the second rectified image. The difference between $X_M$ and $X_T$, or namely the disparity, conveys the depth information of the content within such focusing window.

$$depth = \frac{focal\ length \times baseline}{x_M - x_T}$$

The focal length is measured in rectified pixel intervals, baseline is the true physical distance between the optical centers of the two cameras. $x_M$ and $x_T$ are the horizontal (parallel to the baseline direction) coordinates of the contents in the two windows of the rectified images.

Given the focusing distance, an optimized fusion of the first image at 1×, the second image at 2× and the third image at 3× may be estimated.

Figure 6:
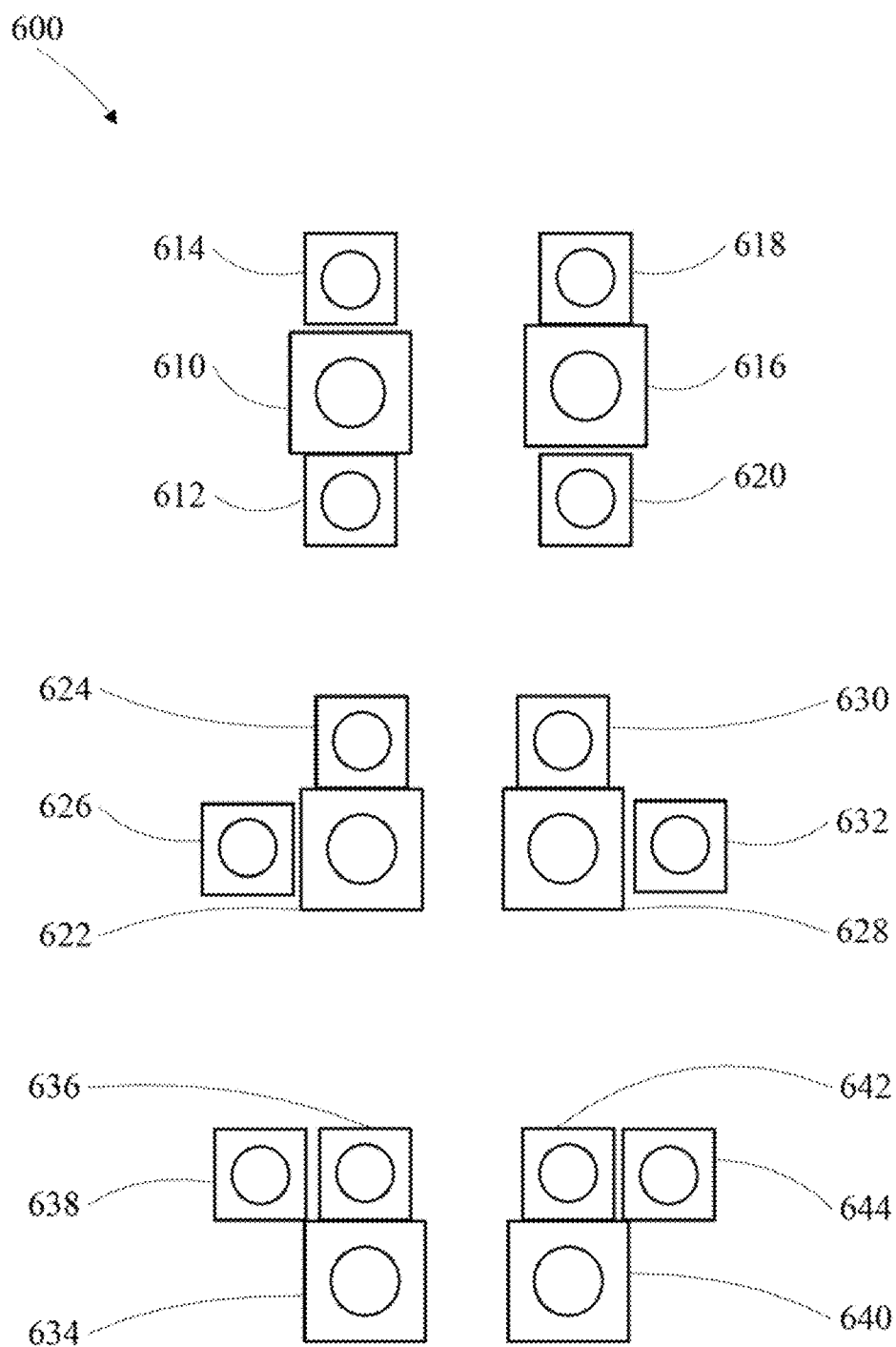
FIG. 6 is a set of options for a three camera layout in accordance with one embodiment of the disclosure.

FIG. 6 depicts a variety of ways in which the third camera module may be secured to the dual camera module. In 610 through 620 the camera modules are aligned in a linear fashion with the second and third camera modules being located on opposite sides of the first camera module. In 622 through 632 the third camera module is orthogonal to the second camera module and is mated to the first camera module. In 634 through 644 the third camera module is orthogonal to the first camera module and is mated to the second camera module.

In one embodiment a three camera alignment system, has a first camera module having a first fixed zoom and a second camera module has a second fixed zoom and is coupled to the first camera module. The second camera module is calibrated to the first camera module, and a third camera module having a third fixed zoom which is coupled to at least one of the first camera module and second camera modules. The third camera module is aligned to the calibrated first camera module and second camera module based on block matching along epipolar lines.

Figure 7:
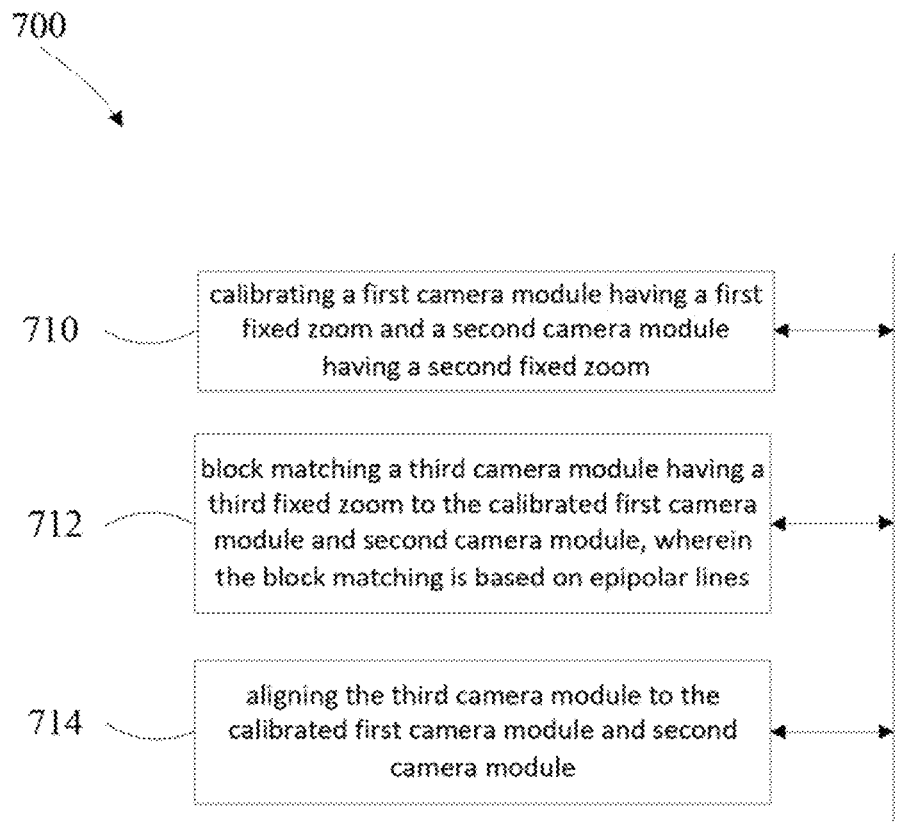
FIG. 7 is an example flow diagram of a three camera alignment in accordance with one embodiment of the disclosure.

FIG. 7 depicts a three camera alignment method example is including calibrating 710 a first camera module having a first fixed zoom and a second camera module having a second fixed zoom. Then, a block matching 712 is performed on a third camera module having a third fixed zoom to the calibrated first camera module and second camera module based on epipolar lines. Then the third camera module is aligned 714 to the third camera module to the calibrated first camera module and second camera module.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A three camera alignment system, comprising:
a first camera module of a mobile device having a first fixed zoom and outputting a first zoomed image;
a second camera module of the mobile device having a second fixed zoom coupled to the first camera module and outputting a second zoomed image, wherein the second camera module is calibrated to the first camera module and the first zoomed image is fused to the second zoomed image, wherein the second fixed zoom is greater than the first fixed zoom and wherein a second field of view of the second camera module is nested completely within a first field of view of the first camera module and the first camera module of the mobile device is mated to the second camera module of the mobile device; and
a third camera module of the mobile device having a third fixed zoom and outputting a second zoomed image is coupled to at least one of the first camera module and the second camera module, wherein the third camera module is aligned to the first camera module and the first zoomed image is fused to the third zoomed image or the second camera module and the second zoomed image is fused to the third zoomed image based on block matching along epipolar lines and wherein the third fixed zoom is greater than the second fixed zoom and wherein a third field of view of the third camera module is nested completely within the second field of view of the second camera module which is nested completely within a first field of view of the first camera module and the third camera module of the mobile device is mated to the first camera module of the mobile device.

2. The three camera alignment system of claim 1, wherein the third camera module is algorithmically rotated to align the third camera module with the first or second camera module to calibrate out misalignments between the third camera module and the respective camera module.

3. The three camera alignment system of claim 1, wherein the third camera module is algorithmically shifted to align the third camera module with the first or second camera module to calibrate out misalignments between the third camera module and the respective camera module.

4. The three camera alignment system of claim 1, wherein the second camera module to first camera module calibration pre-defines a relationship between a disparity and a z-distance.

5. The three camera alignment system of claim 1, wherein at least one of the first camera module, the second camera module and the third camera module is auto focus.

6. A three camera alignment method, comprising:
calibrating a first camera module of a mobile device having a first fixed zoom and outputting a first zoomed image and a second camera module of the mobile device having a second fixed zoom and outputting a second zoomed image, wherein the second fixed zoom is greater than the first fixed zoom and wherein a second field of view of the second camera module is nested completely within a first field of view of the first camera module and the first zoomed image is fused to the second zoomed image and the first camera module of the mobile device is mated to the second camera module of the mobile device;
block matching a third camera module of the mobile device having a third fixed zoom and outputting a third zoomed image to the calibrated first camera module and the first zoomed image is fused to the third zoomed image or the second camera module and the second zoomed image is fused to the third zoomed image, wherein the block matching is based on epipolar lines and wherein the third fixed zoom is greater than the second fixed zoom and wherein a third field of view of the third camera module is nested completely within the second field of view of the second camera module which is nested completely within a first field of view of the first camera module and the third camera module of the mobile device is mated to the first camera module of the mobile device; and aligning the third camera module to the calibrated first camera module and second camera module of the mobile device.

7. The three camera alignment method of claim 6, further comprising algorithmically rotating the third camera module to align the third camera module with the first or second camera module to calibrate out misalignments between the third camera module and the respective camera module.

8. The three camera alignment method of claim 6, further comprising algorithmically shifting the third camera module to align the third camera module with the first or second camera module to calibrate out misalignments between the third camera module and the respective camera module.

9. The three camera alignment method of claim 6, wherein the second camera module to first camera module calibration pre-defines a relationship between a disparity and a z-distance.

10. The three camera alignment method of claim 6, wherein at least one of the first camera module, the second camera module and the third camera module is auto focus.

* * * * *